United States Patent [19]

Börner

[11] Patent Number: 4,848,680
[45] Date of Patent: Jul. 18, 1989

[54] RAW FOOD CUTTER

[75] Inventor: Alfred Börner, Niederkail, Fed. Rep. of Germany

[73] Assignee: A. Börner GmbH, Fed. Rep. of Germany

[21] Appl. No.: 93,042

[22] Filed: Sep. 4, 1987

[30] Foreign Application Priority Data

Sep. 29, 1986 [DE] Fed. Rep. of Germany ... 8625986[U]
Jul. 6, 1987 [EP] European Pat. Off. ........ 87109688.9

[51] Int. Cl.$^4$ ............................................. A47J 43/25
[52] U.S. Cl. ..................... 241/95; 241/168; 241/273.1; 30/279 R; 30/287; 30/304
[58] Field of Search ................. 30/123.5, 123.6, 123.7, 30/278, 279 R, 287, 304; 83/858; 241/95, 168, 273.1, 273.4, 274

[56] References Cited

U.S. PATENT DOCUMENTS 3,703,918 11/1972 Börner ............................ 30/287 X
4,120,089 10/1978 Börner ............................ 30/304 X
4,290,196 9/1981 Börner ............................ 30/304 X

FOREIGN PATENT DOCUMENTS 0189743 1/1986 European Pat. Off. .
1991402 5/1968 Fed. Rep. of Germany .
1273759 7/1968 Fed. Rep. of Germany ........ 30/278
2260358 2/1977 Fed. Rep. of Germany .
3500495 7/1986 Fed. Rep. of Germany .

Primary Examiner—Frank T. Yost
Assistant Examiner—Michael D. Folkerts

[57] ABSTRACT

Raw food cutter for cutting raw food into strips, with a base plate on whose top surface are provided two butting faces located in one plane and between which is arranged at least one knife row running substantially at right angles to the cutting direction and whose knives with approximately inverted U-shaped cutting edges that project above the butting faces and are open towards the underside of the base plate. The underside of the knife is at least partly inclined towards the base plate, the knife row is constructed in arcuate meander-like manner and preferably in one piece from a thin metal band. The thin metal band includes upper and lower transverse webs and lateral webs linking them and is fixed with the lower transverse webs in the base plate. The lower transverse webs are located below or level with the butting faces, while the upper transverse webs project above the butting faces and, based on the cutting direction, are oriented substantially parallel to the plane of the butting faces and the upper transverse webs are oriented parallel to the plane of the butting faces for forming double-edged knives. Based on the cutting direction, the upper transverse webs are centrally dented or depressed towards the base plate. The cutter is characterized in that on the base plate level with the knife rows are formed openings bounded by longitudinal webs and which are located below the upper transverse webs of knives, the lower transverse webs of knives and are jointly injection moulded into longitudinal webs of base plate.

14 Claims, 1 Drawing Sheet

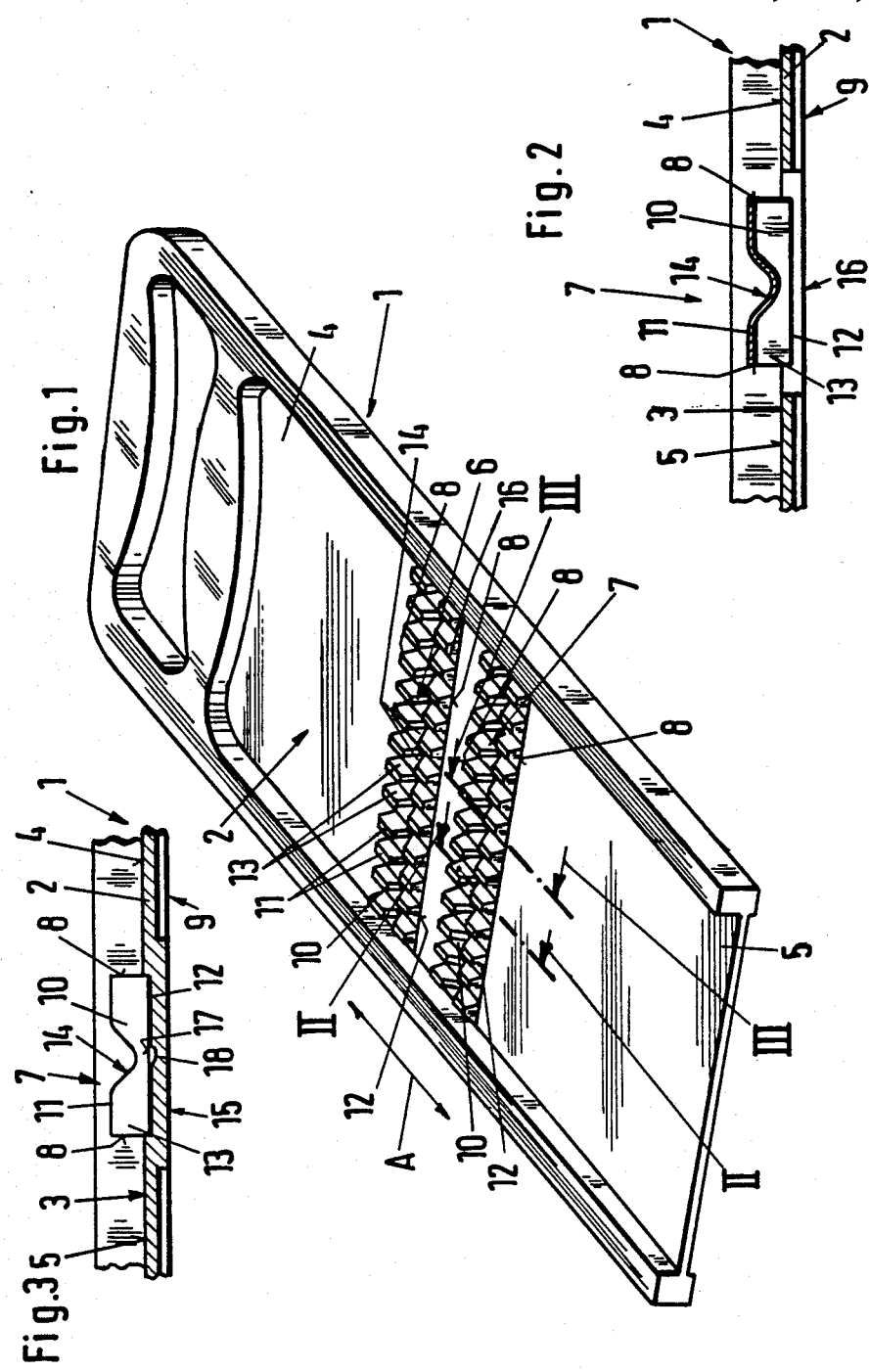

RAW FOOD CUTTER

BACKGROUND OF THE INVENTION

The invention relates to a raw or uncooked food cutter.

German patent 22 60 358 discloses a raw food cutter in the form of a kitchen grater, which is made from a plastic injection moulding and has a frame with rectangular holes into which pass in the cutting direction teeth curved arcuately downwards from the cutting edge. Further teeth are provided on the back of the kitchen grater. Such a grater can be used for shredding vegetables, fruit, etc. whilst expending relatively little energy. The shredded product is largely separated in the form of thin strips or grated and mashed.

Admittedly the expenditure of energy is much less when using the aforementioned kitchen grater than with the other hitherto known graters, but is still too high in order to shred the product in a drawing movement, i.e. if the cutting edges of the knives are directed downwards.

DE-OS 35 00 495 discloses a kitchen appliance for cutting potatoes, particularly semi-cooked potatoes, in which there are double-edged plastic knives connected in one piece with the base plate in the form of two successively displaced transverse rows. In this kitchen appliance, the cutting edges of the knives are initially parallel to the cutting direction and are then bent concavely downwards. This kitchen appliance is particularly suitable for producing curl-like potato strips, if the potatoes are semi-cooked beforehand. This kitchen appliance is less satisfactory and requires more energy expenditure when used for dealing with raw food.

EP-OS 0 189 743 discloses a raw food cutter of the aforementioned type, which has in principle proved completely satisfactory. The problem of the present invention is to improve the manufacture and handling of said cutter in such a way that the cutting resistance is further reduced and manufacture is simplified and made less expensive.

SUMMARY OF THE INVENTION

According to the invention this problem is solved by the features of the invention as described herein.

A U-shaped cross-section is retained over a considerable length of the cutting process. As a result the cutting forces are significantly reduced compared with conventional kitchen graters. Instead of being displaced, the material cut is cleanly cut through. Surprisingly there is also no clogging of the base plate free space left under the knives. The substantially parallel arrangement of the knife cutting edges in fact appears to improve the free cutting of the individual knives. Apart from simple manufacture by stamping and the prior, two-sided, mechanical sharpening, the advantage of constructing the knife row from a metal band is that the latter can be relatively thin and is e.g. approximately 1/10 mm. This thin cross-section of the cutting edges naturally extends over the entire cutting edge length and depth, so that during cutting the product is not squeezed. The significance of this advantage is immediately apparent if it is remembered that the thickness of the lateral webs must be pressed through the cut material. Despite the use of such a thin metal band, the enormous stability of the knife is surprising. This is on the one hand apparently due to the meander-like or undulating construction of the metal band and on the other to the fact that each lower transverse web is fixed in the base plate.

Admittedly German utility model 19 91 402 discloses a domestic cutting appliance for cutting chips or French fries, in which there is rectangularly wave-like bent knife arranged at right angles to the cutting direction. This knife is fixed to the facing longitudinal strips of the kitchen appliance. However, as a result of the knife size and cutting edge thickness, it is not suitable for cutting raw food.

A so-called waffle cutter is also known, in which a wave-like bent knife fitted in sloping manner with respect to the cutting direction is fixed in the rear bearing plate. However, this cutter also has excessively large knives and cutting edge thicknesses.

As stated hereinbefore, when cutting raw food it is a question of producing very thin strips. If these strips are to be cut by means of U-shaped knives, the problem arises that the lateral webs must pass through the vegetable. With the large number of lateral webs necessary for such raw food graters, the cutting edge thickness can be summated or added to such an extent that not only is the cutting resistance increased, but also there is a considerable increase in the risk of the already cut strips jamming.

However, problems can occur due to the resulting stability problems of the knife row through merely reducing the thickness of the cutting edge. These contradictory requirements have been taken into account for the first time by the present invention.

According to a preferred embodiment, the upper transverse webs for forming double-edged knives are oriented parallel to the plane of the butting faces and, based on the cutting direction, are in each case centrally dented or depressed towards the base plate. Thus, the cutting process takes place with substantially no additional resistance. The deflection of the cut product by the depressions only takes place when it has acquired a certain length, so that to a greater or lesser extent it bends round of its own accord. Due to these features it is easy for the housewife to cut the product by a reciprocating movement during each stroke or travel. This is not so obvious, because hitherto the high cutting resistance in the case of raw food graters has led to a relatively poor cutting result during the return movement, i.e. less is cut during the return movement than during the outward movement.

An advantageous deflection of the cut strips is obtained in that the depressions of the upper transverse webs are roughly triangular, when considered at right angles to the cutting direction.

Advantageously the depressions end at a distance above the plane of the butting faces, which is sufficient for the free cutting of the knives. In addition, the deflecting forces are kept very small by the depressions.

An advantageous distance between the center of a depression and the associated cutting edge of a knife corresponds to roughly two to three times the depth of the depression. The distance from the edge of a depression up to the associated, adjacent cutting edge roughly corresponds to the depth of a depression. As a result of these size ratios the cutting process is particularly advantageous, whilst the distance from the edge of a depression to the adjacent cutting edge can also be made somewhat larger.

According to a preferred embodiment, the width of an upper transverse web roughly corresponds to that of a lower transverse web.

Preferably according to a further development of the raw food grater, there are two knife rows in succession in the cutting direction and displaced at right angles thereto on the base plate.

Although it is preferred to arrange the knife rows in sloping manner with respect to the cutting direction, the longitudinal extension of the knife extending in the latter direction, according to an embodiment the knife rows are fitted to the base plate at right angles to the cutting direction. Advantageously the base plate is made from plastic.

A particularly stable fitting of the knife row to the base plate is obtained if openings bounded by longitudinal webs provided level with the knife rows on the base plate located below the upper transverse webs of the knife, the lower transverse webs of the knife also being injection moulded in the longitudinal webs of the base plate.

The free cutting of the knives is further facilitated in that the openings are made longer than the upper transverse webs of the knives and terminate at a distance from the cutting edges of the latter.

A good anchoring of the lower transverse webs in the longitudinal webs of the base plate is brought about in that impressions are made on the lower transverse webs for anchoring the latter in the plastic.

The good anchoring can be further improved in that the depressions are provided with openings for the passage of the plastic. During the injection moulding of the raw food cutter, the plastic passes through these openings, which leads to a positive connection between the lower transverse webs of the knife and the base plate.

The anchoring of the lower transverse webs is also improved in that, based on the cutting direction, the impressions are located in the center of the lower transverse webs.

BRIEF DESCRIPTION OF THE DRAWINGS

An embodiment of the invention is described in greater detail hereinafter relative to the drawings, wherein:

FIG. 1 is a perspective plan view of the inventive raw food cutter.

FIG. 2 is a section through a knife row along line II—II of FIG. 1; and

FIG. 3 is a section through a knife row along line III—III of FIG. 1.

DESCRIPTION OF THE PREFERRED EMBODIMENT

FIG. 1 shows a raw food cutter 1 for cutting raw food strips. Cutter 1 comprises a base plate 2, on whose top surface 3 are provided two butting faces 4 and 5 located in one plane. Between butting faces 4, 5 are provided two knife rows 6, 7 displaced reciprocally or displaced in relation to each other and at right angles to cutting direction A. Knife rows 6, 7 have knives with U-shaped cutting edges 8, whose height projects over the butting faces 4, 5 and are open towards the underside 9 of base plate 2. The knife underside is at least partly inclined towards the base plate (cf. FIG. 2).

As can be gathered from FIG. 1, the knife rows in each case comprise a thin metal band 10 with a thickness of approximately 1/10 mm. Metal band 10 is bent in meander-like manner, accompanied by the formation of upper transverse webs 11, lower transverse webs 12 and lateral webs 13 interconnecting the same.

As can be clearly gathered from FIG. 3, the lower transverse webs are fixed in the base plate and positioned below the butting faces 4, 5. The upper transverse webs 11 project over and beyond butting faces 4, 5 and, based on the cutting direction A, are oriented substantially parallel to the plane of butting faces 4, 5.

As can be gathered from the drawings, knife rows 6, 7 are constructed in double-edged form, the upper transverse webs 11 being centrally provided with dents or depressions 14 directed towards the base plate.

It can be gathered from FIGS. 2 and 3 that the depressions 14 of the upper transverse webs 11 are roughly triangular, considered at right angles to cutting direction A. Depressions 14 terminate at a distance above the plane of butting faces 4 and 5.

As can be clearly gathered from FIG. 2, the distance between the centre of a depression 14 and the associated cutting edge 8 of a knife is roughly two to three times the depth of depression 14. Measured from the top edge of a depression 14, the distance to the associated adjacent cutting edge 8 roughly corresponds to the depth of a depression.

As can be gathered from FIG. 1 the width of an upper transverse web 11 roughly corresponds to that of a lower transverse web 12.

Although the knife rows 6, 7 could also be inclined to the cutting direction A, in this embodiment they are fitted to the base plate 2 at right angles to cutting direction A.

Base plate 2 is made from plastic. The metal bands 10 from which the knife rows 6, 7 are made are also injection moulded into the base plate 2 of the raw food cutter 1. For this purpose on base plate 2 and level with the knife rows 6, 7 are provided openings 16 bounded by longitudinal webs 15 and which are located below the upper transverse webs 11 of knives 6, 7. The lower transverse webs 12 of knives 6, 7 are jointly injection moulded in to the longitudinal webs 15 of base plate 2.

Impressions 17 are made in the transverse webs for the better anchoring of the lower transverse webs 12 in the longitudinal webs 15 of base plate 2.

To ensure even better anchoring of the transverse webs of the knives in the longitudinal webs of the base plate, the impressions 17 are provided with openings 18 through which the plastic can pass during injection moulding. Based on cutting direction A, impressions 17 and also openings 18 are located in the center of the lower transverse webs 12.

As can be particularly well gathered from FIG. 2, openings 16 are longer than the upper transverse webs 11 of knives 6, 7 and terminate at a distance from the knife cutting edges 8. This cannot be gathered as clearly from FIG. 1.

The invention functions as follows. The raw food cutter enables vegetables to be cut into very fine strips without any pulping or other damage occurring.

At the start of the shredding process, the material for cutting is placed on the upper butting face 4 and is then guided against the first knife row 6. When the product strikes against the cutting edge 8 of the first knife row 6, the upper transverse webs 11 and the associated lateral webs 13 of knife row 6 pass into the product without bending down the already cut part.

Only when the leading edge of the cut material reaches depression 14 is the cut strip deflected downwards with a relatively long lever arm of approximately two to three times the depth of depression 14. This deflection is sufficient for the cut strips to pass through openings 16 in such a way that they pass out of the openings 16 on the underside of base plate 2.

After passing through the first knife row 6, the cut material encounters the second knife row 7, which is displaced with respect to the first knife row 6. The cut product parts left behind are now cut in the form of strips as described hereinbefore.

When the cut product is located on the lower butting face 5, it is once again brought against knife row 7 by a pulling movement of the arm, but this now takes place in the opposite direction.

As a result of the extremely small cutting resistance, the entire surface of the cut product remains on the butting face 5, without any tilting occurring. This is not so obvious, because as a result of the unfavourable force application to the cut product during the upward pulling movement, even in the case of a moderate resistance on its leading edge, said product would tend to lift from the butting face 5, but this problem does not occur here.

As the strips cut during the outward movement have already dropped out of the openings 16, the latter are now free for the passage of the strips cut during the return movement.

After passing knife row 7, in the same way as described hereinbefore further strips are cut from the cut product on knife row 6.

The inventive features disclosed in the above description, the drawings and claims can be essential to the realization of the different embodiments of the invention, either singly or in random combination.

I claim:

1. An elongated raw food cutter for cutting raw food into strips, with a base plate on whose top surface are provided two butting faces located in one plane and between which is arranged at least one knife row having a plurality of knives running substantially at right angles to a cutting direction substantially parallel to the longitudinal axis of the cutter and whose knives with approximately inverted U-shaped cutting edges project heightwise over the butting faces and are open towards the underside of the base plate, the underside of each knife being at least partly inclined toward the base plate, the knife row being constructed in arcuate meander-like manner and in one piece from a thin metal band, having upper and lower transverse webs and lateral webs linking said upper and lower webs and being fixed with the lower transverse webs in the base plate, the lower transverse webs are located below or level with the butting faces, whilst the upper transverse webs project beyond the butting faces and, based on the cutting direction, are oriented substantially parallel to the plane of the butting faces and the upper transverse webs are oriented parallel to the plane of the butting faces for forming double-edged knives and, based on the cutting direction, define a central depression extending towards the base plate, characterized in that on the base plate (2) in the area of said at least one knife row (6, 7) are formed openings (16) bounded by longitudinal webs (15) and which are located below the upper transverse webs (11) of said at least one knife row (6, 7), the lower transverse webs (12) of the knives (6, 7) being jointly injection moulded into the longitudinal webs (15) of the base plate (2).

2. A raw food cutter according to claim 1, characterized in that the openings (16) are longer than the upper transverse webs (11) of said at least one knife row (6, 7) and have terminal edges that are spaced from the cutting edges (8) of said at least one knife row (6, 7).

3. A raw food cutter according to claim 1, characterized in that impressions (17) are provided in the lower transverse webs (12) of said at least one knife row (6, 7) for anchoring the transverse webs (12).

4. A raw food cutter according to claim 3, characterized in that the impressions (17) are provided with openings (18) for the passage of injection moulded plastic.

5. A raw food cutter according to claim 3, characterized in that, based on a cutting direction (A), which is substantially parallel to the longitudinal axis of the cutter, the impressions (17) are made in the center of the lower transverse webs (12).

6. A raw food cutter according to claim 1, characterized in that the knife row (6, 7) is made from a metal band which is sharpened at both faces.

7. A raw food cutter according to claim 1, characterized in that the depressions (14) of the upper transverse webs (11) are approximately triangularly-shaped when viewed at substantially right angles to a cutting direction (A), which is substantially parallel to the longitudinal axis of the cutter.

8. A raw food cutter according to claim 1, characterized in that the depressions (14) in the upper transverse web terminate at a distance above the plane of the butting faces (4, 5).

9. A raw food cutter according to claim 1, characterized in that the distance between the center of a depression (14) and an associated cutting edge (8) of said knife row (6, or 7) is about two to three times the depth of the depression (14).

10. A raw food cutter according to claim 1, characterized in that each knife in a row includes a depression wherein the distance from the edge of the depressions (14) to the associated, adjacent cutting edge (8) is about the same as the depth of the depression (14).

11. A raw food cutter according to claim 1, characterized in that each row of knives includes an upper transverse web and the width of the upper transverse web (11) is substantially the same as that of the lower transverse web (12).

12. A raw food cutter according to claim 1, characterized in that there is provided at least two knife rows (6,7) arranged successively in a cutting direction (A) and at substantially right angles thereto on the base plate (2).

13. A raw food cutter according to claim 1, characterized in that said at least one knife row is fitted to the base plate (2) at right angles to a cutting direction (A).

14. A raw food cutter according to claim 1, characterized in that the base plate (2) is made from plastic.

* * * * *